(12) United States Patent
Sato

(10) Patent No.: US 11,885,721 B2
(45) Date of Patent: Jan. 30, 2024

(54) ABNORMALITY DETERMINATION METHOD, ABNORMALITY DETERMINATION DEVICE, AND ABNORMALITY DETERMINATION SYSTEM

(71) Applicant: Seiko Epson Corporation, Tokyo (JP)

(72) Inventor: Kenta Sato, Shiojiri (JP)

(73) Assignee: SEIKO EPSON CORPORATION

(*) Notice: Subject to any disclaimer, the term of this patent is extended or adjusted under 35 U.S.C. 154(b) by 19 days.

(21) Appl. No.: 17/705,649

(22) Filed: Mar. 28, 2022

(65) Prior Publication Data
US 2022/0307946 A1 Sep. 29, 2022

(30) Foreign Application Priority Data
Mar. 29, 2021 (JP) .................. 2021-054822

(51) Int. Cl.
*G06F 11/30* (2006.01)
*G01M 99/00* (2011.01)

(52) U.S. Cl.
CPC ........ *G01M 99/008* (2013.01); *G01M 99/005* (2013.01)

(58) Field of Classification Search
CPC .................................................. G01M 99/008
See application file for complete search history.

(56) References Cited

FOREIGN PATENT DOCUMENTS

| JP | 2005-003474 A | | 1/2005 |
|---|---|---|---|
| JP | 2011-237576 A | | 11/2011 |
| JP | 2013-199804 | * | 10/2013 |
| JP | 2013-199804 A | | 10/2013 |
| JP | 2019-023771 A | | 2/2019 |
| JP | 2019023771 | * | 2/2019 |
| WO | 2017-090515 A | | 6/2017 |

* cited by examiner

*Primary Examiner* — Phuong Huynh
(74) *Attorney, Agent, or Firm* — Harness, Dickey & Pierce, P.L.C.

(57) ABSTRACT

An abnormality determination method includes: a first distance calculation step of calculating, based on measurement data of an object, a first Mahalanobis distance in a first unit space corresponding to a normal mode of the object; a second distance calculation step of calculating, based on the measurement data, an (i+1)-th Mahalanobis distance in an (i+1)-th unit space corresponding to an i-th abnormal mode of the object for each integer i greater than or equal to 1 and less than or equal to N, N being an integer greater than or equal to 2; and an abnormality determination step of determining, based on the second to (N+1)-th Mahalanobis distances, one of the first to N-th abnormal modes where the object is when the first Mahalanobis distance exceeds a threshold value.

6 Claims, 7 Drawing Sheets

FIG. 1
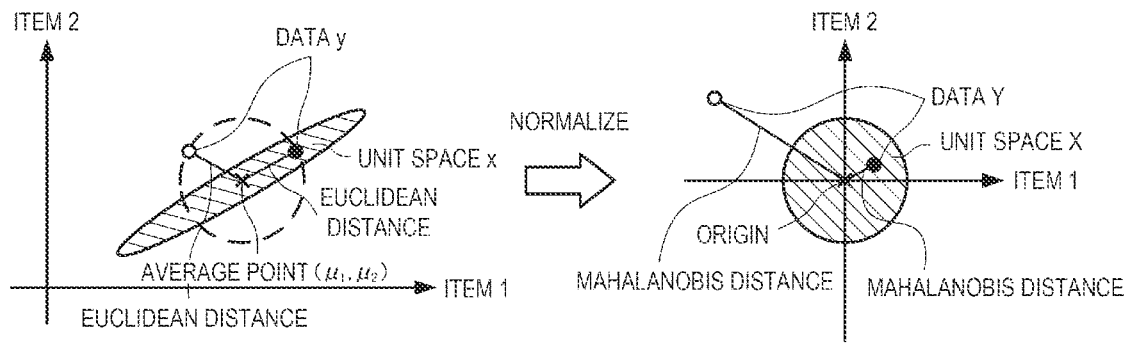
FIG. 2
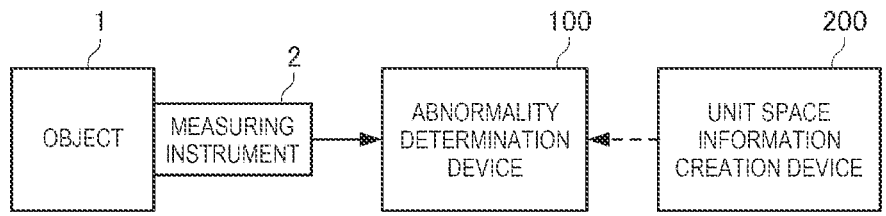
FIG. 3
UNIT SPACE INFORMATION
| STATE OF OBJECT | AVERAGE VALUE OF ITEMS | STANDARD DEVIATION OF ITEMS | INVERSE MATRIX OF CORRELATION MATRIX |
|---|---|---|---|
| NORMAL MODE | $\mu_{(1)1} \sim \mu_{(1)K}$ | $\sigma_{(1)1} \sim \sigma_{(1)K}$ | $R_{(1)}^{-1}$ |
| FIRST ABNORMAL MODE | $\mu_{(2)1} \sim \mu_{(2)K}$ | $\sigma_{(2)1} \sim \sigma_{(2)K}$ | $R_{(2)}^{-1}$ |
| ⋮ | ⋮ | ⋮ | ⋮ |
| Nth ABNORMAL MODE | $\mu_{(N+1)1} \sim \mu_{(N+1)K}$ | $\sigma_{(N+1)1} \sim \sigma_{(N+1)K}$ | $R_{(N+1)}^{-1}$ |

ABNORMALITY DETERMINATION METHOD, ABNORMALITY DETERMINATION DEVICE, AND ABNORMALITY DETERMINATION SYSTEM

The present application is based on, and claims priority from JP Application Serial Number 2021-054822, filed Mar. 29, 2021, the disclosure of which is hereby incorporated by reference herein in its entirety.

BACKGROUND

1. Technical Field

The present disclosure relates to an abnormality determination method, an abnormality determination device, and an abnormality determination system.

2. Related Art

JP-A-2019-23771 describes a fault diagnosis apparatus. The apparatus generates a synchronized normal data group by synchronizing a plurality of normal operation characteristics detected a plurality of times when equipment is in a normal state, generates synchronized diagnosis data by synchronizing the synchronized normal data group with diagnosis operation characteristics detected when the equipment is in a diagnosis state, forms a unit space based on the synchronized normal data group, calculates a Mahalanobis distance in the unit space of the synchronized diagnosis data, compares the Mahalanobis distance with a preset threshold value, and determines an equipment fault when the Mahalanobis distance exceeds the threshold value.

The fault diagnosis apparatus described in JP-A-2019-23771 can determine an equipment fault when the Mahalanobis distance exceeds the threshold value, and cannot specify an abnormal mode.

SUMMARY

An aspect of the present disclosure relates to an abnormality determination method. The method includes: a first distance calculation step of calculating, based on measurement data of an object, a first Mahalanobis distance in a first unit space corresponding to a normal mode of the object; a second distance calculation step of calculating, based on the measurement data, an (i+1)-th Mahalanobis distance in an (i+1)-th unit space corresponding to an i-th abnormal mode of the object for each integer i greater than or equal to 1 and less than or equal to N, N being an integer greater than or equal to 2; and an abnormality determination step of determining, based on the second to (N+1)-th Mahalanobis distances, one of the first to N-th abnormal modes where the object is when the first Mahalanobis distance exceeds a threshold value.

Another aspect of the present disclosure relates to an abnormality determination device. The device includes: a first distance calculation circuit configured to calculate, based on measurement data of an object, a first Mahalanobis distance in a first unit space corresponding to a normal mode of the object; a second distance calculation circuit configured to calculate, based on the measurement data, an (i+1)-th Mahalanobis distance in an (i+1)-th unit space corresponding to an i-th abnormal mode of the object for each integer i greater than or equal to 1 and less than or equal to N, N being an integer greater than or equal to 2; and a determination circuit configured to determine, based on the second to (N+1)-th Mahalanobis distances, one of the first to N-th abnormal modes where the object is when the first Mahalanobis distance exceeds a threshold value.

Still another aspect of the present disclosure relates to an abnormality determination system. The system includes the abnormality determination device, and a measuring instrument attached to the object and configured to output the measurement data.

BRIEF DESCRIPTION OF THE DRAWINGS

FIG. 1 shows a concept of an MT method.

FIG. 2 shows a configuration example of an abnormality determination system.

FIG. 3 shows an example of unit space information.

DESCRIPTION OF EXEMPLARY EMBODIMENTS

Figure 4:
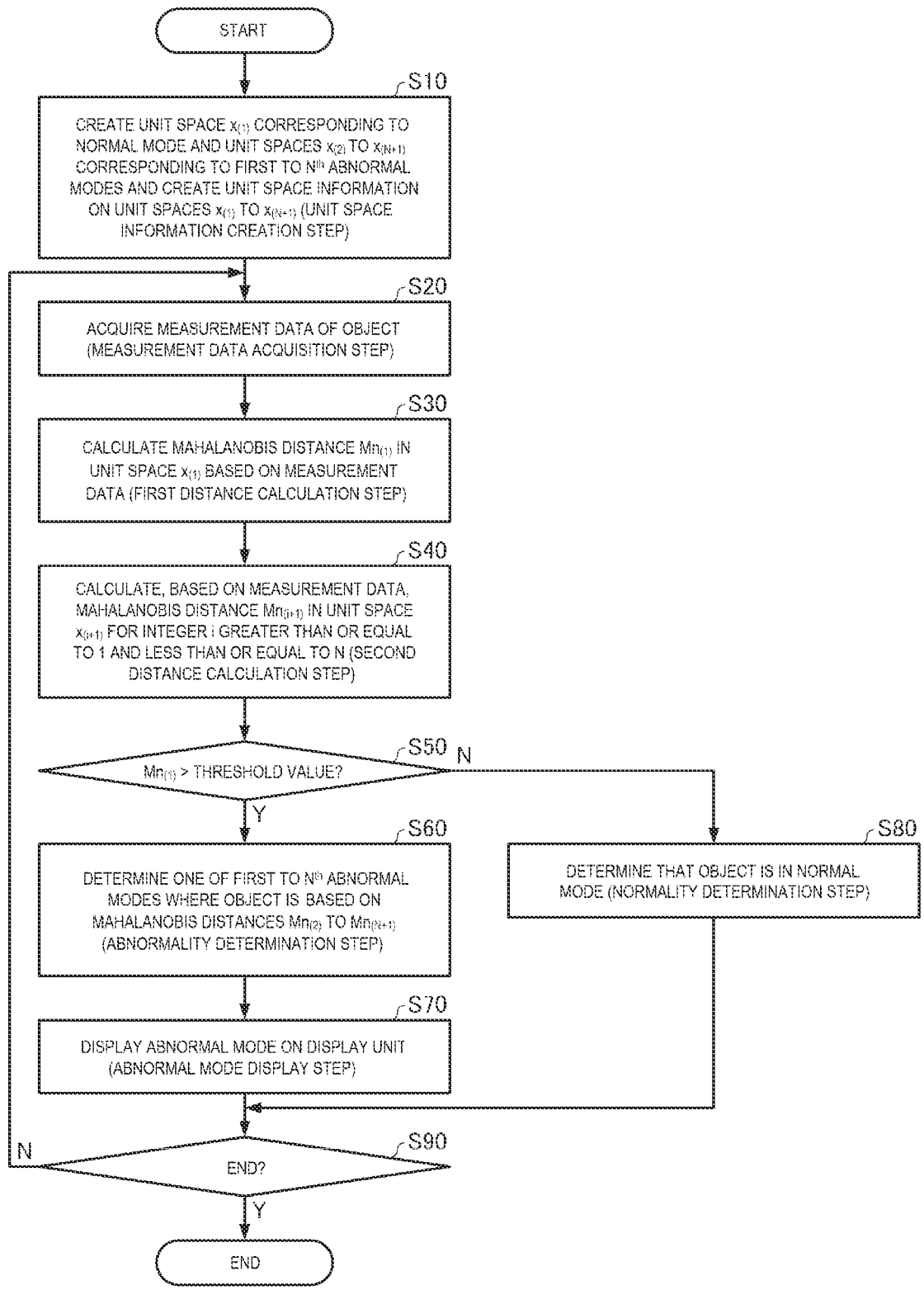
FIG. 4 is a flowchart showing a procedure of an abnormality determination method according to a first embodiment.

Hereinafter, preferred embodiments of the present disclosure will be described in detail with reference to the drawings. The embodiments described below do not in any way limit contents of the present disclosure described in the claims. Not all configurations to be described below are necessarily essential components of the present disclosure.

1. First Embodiment 1-1. Mahalanobis-Taguchi Method

As a method for objectively determining whether an object changed from a predetermined state, a Mahalanobis-Taguchi method is known. Hereinafter, the Mahalanobis-Taguchi method is referred to as "MT method".

In the MT method, a unit space x in a K-dimensional space having K items as respective axes is created in advance based on a group of measurement data acquired when the object is in a predetermined state. Thereafter, a Mahalanobis distance of data in the unit space x is calculated. The data includes values of K items calculated based on newly acquired measurement data.

As shown in equations (1) and (2), the unit space x is a data group including L data $x_1$ to $x_L$ each including values of K items. The unit space x is calculated based on the group of measurement data acquired when the object is in the predetermined state. Each of K and L is an integer greater than or equal to 2. In equation (2), $x_1$ is 1st data constituting the unit space x, and $x_{11}$ to $x_{1K}$ are values of K items included in the data $x_1$.

$$x = (x_1, x_2, \ldots x_L) \tag{1}$$

$$x_l = (x_{l1}, x_{l2}, \ldots x_{lK}) (l=1, 2, \ldots L) \tag{2}$$

For each integer l greater than or equal to 1 and less than or equal to L, the value $x_{lk}$ of a k-th item included in the 1st data $x_1$ is normalized by equation (3), and a normalized value $x_{lk}$ is acquired.

$$X_{lk} = \frac{(x_{lk} - \mu_k)}{\sigma_k} \quad (k = 1, 2, \cdots K) \tag{3}$$

In equation (3), $\mu_k$ is an average value of values $x_{lk}$ to $x_{Lk}$ of L k-th items included in the L data $x_1$ to $x_L$, and is calculated by equation (4).

$$\mu_k = \frac{1}{L}\sum_{l=1}^{L} x_{lk} \tag{4}$$

In equation (3), $\sigma_k$ is a standard deviation of the values $x_{lk}$ to $x_{Lk}$ of the L k-th items included in the L data $x_1$ to $x_L$, and is calculated by equation (5).

$$\sigma_k = \sqrt{\frac{1}{L}\sum_{l=1}^{L} x_{lk}^2} \tag{5}$$

For each integer l greater than or equal to 1 and less than or equal to K, the 1st data $x_1$ represented by equation (2) is normalized to data $x_1$ including normalized values $X_{11}$ to $X_{1K}$ of K items as represented by equation (6).

$$X_l = (X_{l1}, X_{l2}, \ldots X_{lK}) (l=1,2, \ldots L) \tag{6}$$

The unit space x represented by equation (1) is normalized to a unit space X that is a data group including L normalized data $X_1$ to $X_L$ as represented by equation (7).

$$X = (X_1, X_2, \ldots X_L) \tag{7}$$

Equations (8) and (9) define a correlation matrix R relating to K items in the normalized unit space X.

$$R = \begin{pmatrix} 1 & r_{12} & \cdots & r_{1K} \\ r_{21} & 1 & \cdots & r_{2K} \\ \vdots & \vdots & \ddots & \vdots \\ r_{K1} & r_{K2} & \cdots & 1 \end{pmatrix} \tag{8}$$

$$r_{ij} = \frac{\sum_{l=1}^{L} X_{li} \cdot X_{lj}}{\sqrt{\sum_{l=1}^{L} X_{li}^2} \cdot \sqrt{\sum_{l=1}^{L} X_{lj}^2}} \tag{9}$$

Thereafter, data y including values $y_1$ to $y_k$ of K items represented by equation (10) is calculated based on the newly acquired measurement data.

$$y = (y_1, y_2, \ldots y_K) \tag{10}$$

The value $y_k$ of a k-th item included in the data y is normalized by equation (11) using the average value $\mu_k$ and the standard deviation $\sigma_k$, and a normalized value $Y_k$ is acquired.

$$Y_k = \frac{(y_k - \mu_k)}{\sigma_k} \quad (k = 1, 2, \cdots K) \tag{11}$$

The data y represented by equation (10) is normalized to data Y including normalized values $Y_1$ to $Y_K$ of the K items as represented by equation (12).

$$Y = (Y_1, Y_2, \ldots Y_K) \tag{12}$$

A Mahalanobis distance Mn of the data y in the unit space x is calculated by equation (13) using the normalized data Y and an inverse matrix $R^{-1}$ of the correlation matrix R.

$$Mn = \sqrt{\frac{YR^{-1}Y^T}{K}} \tag{13}$$

The greater the Mahalanobis distance Mn is, the farther the data y is from an average point of the unit space x, which means that the similarity between the data y and a data group constituting the unit space x is low. Therefore, when the Mahalanobis distance Mn is greater than a predetermined threshold value, it can be determined that a state of the object changed from the predetermined state. For example, when the predetermined state of the object is a normal mode and the Mahalanobis distance Mn is greater than the predetermined threshold value, it can be determined that the object changed to an abnormal mode.

FIG. 1 shows a concept of the MT method when K=2. In FIG. 1, data y indicated by a black circle and data y indicated by a white circle have the same Euclidean distance to an average point ($\mu_1$, $\mu_2$) of the unit space x, and the data y indicated by a black circle is inside the unit space x while the data y indicated by a white circle is outside the unit space x. Therefore, the similarity between the data y and the data group constituting the unit space x cannot be determined by the Euclidean distance to the average point ($\mu_1$, $\mu_2$) of the unit space x. The Mahalanobis distance Mn between the data y and the average point ($\mu_1$, $\mu_2$) of the unit space x corresponds to a Euclidean distance between the normalized data Y and an origin when the unit space x is normalized to the unit space X in which a distribution range is a circle centered on the origin. As shown in FIG. 1, the Euclidean distance between the normalized data Y indicated by a white circle and the origin, that is, the Mahalanobis distance Mn between the data y indicated by a white circle and the average point ($\mu_1$, $\mu_2$) of the unit space x is greater than the Euclidean distance between the normalized data Y indicated by a black circle and the origin, that is, the Mahalanobis distance Mn between the data y indicated by a black circle and the average point ($\mu_1$, $\mu_2$) of the unit space x. Therefore, the similarity between the data y and the data group constituting the unit space x can be determined by the Mahalanobis distance to the average point ($\mu_1$, $\mu_2$) of the unit space x.

1-2. Abnormality Determination System

FIG. 2 shows a configuration example of an abnormality determination system according to the present embodiment. As shown in FIG. 2, an abnormality determination system 10 of the present embodiment includes a measuring instrument 2 attached to an object 1, and an abnormality determination device 100. The abnormality determination system 10 may further include a unit space information creation device 200.

The object 1 is an object to be subjected to abnormality determination, and the type thereof is not particularly limited, and may be, for example, a structure such as a bridge or a building, or various devices such as a vacuum pump.

The measuring instrument 2 is attached to the object 1, measures a predetermined physical quantity, and outputs measurement data of the object 1 to the abnormality determination device 100. The type of the physical quantity measured by the measuring instrument 2 is not particularly limited. For example, the physical quantity may be acceleration, angular velocity, velocity, displacement, pressure, current, or voltage. The measuring instrument 2 may measure physical quantities of a plurality of axes.

The unit space information creation device 200 creates a unit space $x_{(1)}$ corresponding to a normal mode of the object 1 and unit spaces $x_{(2)}$ to $x_{(N+1)}$ corresponding to the first to N-th abnormal modes of the object 1, and creates unit space information on the unit spaces $x_{(1)}$ to $x_{(N+1)}$ before the operation of the abnormality determination device 100. N is an integer equal to or greater than 2. The unit space $x_{(1)}$ corresponds to the unit space x in equation (1) when the object 1 is in the normal mode. The unit spaces $x_{(2)}$ to $x_{(N+1)}$ correspond to unit spaces x in equation (1) when the object 1 is in the first to N-th abnormal modes, respectively.

For example, the unit space information creation device 200 may create the unit space $x_{(1)}$ based on the measurement data group output from the measuring instrument 2 when the object 1 is in the normal mode, or may attach the measuring instrument 2 or another measuring instrument of the same type as the measuring instrument 2 to another object of the same type as the object 1 and create the unit space $x_{(1)}$ based on the measurement data group output from the measuring instrument 2 or another measuring instrument when another object is in the normal mode. Further, the unit space information creation device 200 may attach the measuring instrument 2 or another measuring instrument of the same type as the measuring instrument 2 to another object of the same type as the object 1, and create each of the unit spaces $x_{(2)}$ to $x_{(N+1)}$ based on the measurement data group output from the measuring instrument 2 or another measuring instrument when another object is in each of the first to N-th abnormal modes. Each of measurement data groups used to create the unit spaces $x_{(2)}$ to $x_{(N+1)}$ preferably includes a plurality of measurement data acquired when a surrounding environment of the object 1 or another object varies every day or every hour, for example.

When the object 1 is a structured, the first to N-th abnormal modes may include fatigue, wear and weathering, scientific corrosion, freezing, ASR, salt damage, neutralization, and the like. When the object 1 is a device, the first to N-th abnormal modes may include unbalance, misalignment, abnormality of a gear device, belt abnormality, clearance problem, backlash, oil whip, lubricant oil shortage, and the like. ASR is the abbreviation for alkali-silica reaction.

The unit space information creation device 200 calculates average values $\mu_{(1)1}$ to $\mu_{(1)K}$ of the K items of the unit space $x_{(1)}$ corresponding to average values $\mu_1$ to $\mu_K$ represented by equation (4) and standard deviations $\sigma_{(1)1}$ to $\sigma_{(1)K}$ of the K items of the unit space $x_{(1)}$ corresponding to standard deviations $\sigma_1$ to $\sigma_K$ represented by equation (5). Similarly, the unit space information creation device 200 calculates average values $\mu_{(i+1)1}$ to $\mu_{(i+1)K}$ of the K items of the unit space $x_{(i+1)}$ corresponding to average values $\mu_1$ to $\mu_K$ represented by equation (4) and standard deviations $\sigma_{(i+1)1}$ to $\sigma_{(i+1)K}$ of the K items of the unit space $x_{(i+1)}$ corresponding to standard deviations $\sigma_1$ to $\sigma_K$ represented by equation (5), for each integer i greater than or equal to 1 and less than or equal to N.

It is preferable that each of the K items in the unit space $x_{(i+1)}$ has a large difference in value between the object 1 in the normal mode and the object 1 in an i-th abnormal mode, for each integer i greater than or equal to 1 and less than or equal to N. For example, the K items may include a peak rate of a physical quantity generated in each of a plurality of axial directions orthogonal to each other. The peak rate is a ratio of a total sum of peak values greater than a predetermined threshold value in a frequency spectrum of a physical quantity signal to a total sum of intensities of all signals. For example, the K items may include an amplitude ratio of the physical quantity generated in each of the plurality of axial directions orthogonal to each other. The amplitude ratio is a ratio of amplitudes of physical quantity signals in any two axial directions. In the present embodiment, the K items are common in the unit spaces $x_{(1)}$ to $x_{(N+1)}$.

The unit space information creation device 200 normalizes the unit space $x_{(1)}$, creates a unit space $X_{(1)}$ corresponding to the unit space X in equation (7) when the object 1 is in the normal mode, and calculates an inverse matrix $R_{(1)}^{-1}$ corresponding to the inverse matrix $R^{-1}$ of the correlation matrix R represented by equation (8) based on the unit space $X_{(1)}$. Similarly, for the integer i greater than or equal to 1 and less than or equal to N, the unit space information creation device 200 normalizes the unit space $x_{(i+1)}$, creates a unit space $x_{(i+1)}$ corresponding to the unit space X in equation (7) when the object 1 is in the i-th abnormal mode, and calculates an inverse matrix $R_{(i+1)}^{-1}$ corresponding to the inverse matrix $R^{-1}$ of the correlation matrix R represented by equation (8) based on the unit space $X_{(i+1)}$.

The unit space information creation device 200 associates the normal mode, the average values $\mu_{(1)1}$ to $\mu_{(1)K}$ of the K items of the unit space $x_{(1)}$, the standard deviations $\sigma_{(1)1}$ to $\sigma_{(1)K}$, and the inverse matrix $R_{(1)}^{-1}$ shown in FIG. 3, creates unit space information in which the i-th abnormal mode, the average values $\mu_{(i)1}$ to $\mu_{(i)K}$ of the K items of the unit space $x_{(i)}$, the standard deviations $\sigma_{(i)1}$ to $\sigma_{(i)K}$, and the inverse matrix $R_{(i)}^{-1}$ are associated for the integer i greater than or equal to 1 and less than or equal to N, and transmits the unit space information to the abnormality determination device 100. The unit space information is stored in a storage circuit (not shown) included in the abnormality determination device 100.

The abnormality determination device 100 acquires measurement data of the object 1 output from the measuring instrument 2 attached to the object 1. The abnormality determination device 100 may directly acquire the measurement data from the measuring instrument 2 by wireless communication or wired communication, or may acquire the measurement data output from the measuring instrument 2 via a communication network such as the Internet. For example, the abnormality determination device 100 may be a personal computer, a portable information device such as a smartphone, or a cloud server.

The abnormality determination device 100 periodically acquires the measurement data of the object 1, for example. The abnormality determination device 100 determines whether the object 1 is in the normal mode or the first to N-th abnormal modes by the MT method based on the acquired measurement data.

Specifically, the abnormality determination device 100 calculates the data y including the values $y_1$ to $y_K$ of the K items in equation (10) based on the acquired measurement data of the object 1. The abnormality determination device 100 calculates data $Y_{(1)}$ corresponding to the data Y represented by equation (12) by using the average values $\mu_{(1)1}$ to $\mu_{(1)K}$ and the standard deviations $\sigma_{(1)1}$ to $\sigma_{(1)K}$ of the K items of the unit space $x_{(1)}$ included in the unit space information. The abnormality determination device 100 calculates a Mahalanobis distance $Mn_{(1)}$ in the unit space $x_{(1)}$ of the data y corresponding to the Mahalanobis distance Mn in equation (13) by using the data $Y_{(1)}$ and the inverse matrix $R_{(1)}^{-1}$ included in the unit space information. When the Mahalanobis distance $Mn_{(1)}$ is smaller than a predetermined threshold value, the abnormality determination device 100 determines that the object 1 is in the normal mode.

When the Mahalanobis distance $Mn_{(1)}$ exceeds the predetermined threshold value, the abnormality determination device 100 calculates data $Y_{(i+1)}$ corresponding to the data Y represented by equation (12) by using the average values $\mu_{(i+1)1}$ to $\mu_{(i+1)K}$ and the standard deviations $\sigma_{(i+1)1}$ to $\sigma_{(i+1)K}$ of the K items of the unit space $x_{(i+1)}$ included in the unit space information for the integer i greater than or equal to 1 and less than or equal to N. The abnormality determination device 100 calculates a Mahalanobis distance $Mn_{(i+1)}$ in the unit space $x_{(i+1)}$ of the data y corresponding to the Mahalanobis distance Mn in equation (13) by using the data $Y_{(i+1)}$ and the inverse matrix $R_{(i+1)}^{-1}$ included in the unit space information for the integer i greater than or equal to 1 and less than or equal to N. The abnormality determination device 100 determines one of the first to N-th abnormal modes where the object 1 is based on Mahalanobis distances $Mn_{(2)}$ to $Mn_{(N+1)}$. In the present embodiment, when a Mahalanobis distance $Mn_{(j)}$ is minimum among the Mahalanobis distances $Mn_{(2)}$ to $Mn_{(N+1)}$, the abnormality determination device 100 determines that the object 1 is in a j-th abnormal mode.

For example, the abnormality determination device 100 may display a determination result on a display unit (not shown).

The abnormality determination device 100 may have a function of the unit space information creation device 200. That is, the abnormality determination device 100 may create the unit space information and store the created unit space information in a storage circuit (not shown).

The unit space $x_{(1)}$ is an example of a first unit space, and the Mahalanobis distance $Mn_{(1)}$ is an example of a first Mahalanobis distance. For the integer i greater than or equal to 1 and less than or equal to N, the unit space $x_{(i+1)}$ is an example of an (i+1)-th unit space, and the Mahalanobis distance $Mn_{(i+1)}$ is an example of an (i+1)-th Mahalanobis distance.

1-3. Abnormality Determination Method

FIG. 4 is a flowchart showing a procedure of an abnormality determination method according to the first embodiment.

As shown in FIG. 4, first, in a unit space information creation step S10, the unit space information creation device 200 creates the unit space $x_{(1)}$ corresponding to the normal mode of the object 1 and the unit spaces $x_{(2)}$ to $x_{(N+1)}$ corresponding to the first to N-th abnormal modes of the object 1 and creates the unit space information on the unit spaces $x_{(1)}$ to $x_{(N+1)}$. Specifically, the unit space information creation device 200 creates the unit spaces $x_{(1)}$ to $x_{(N+1)}$ represented by equation (1), and calculates average values $\mu_{(j)1}$ to $\mu_{(j)K}$ and standard deviations $\sigma_{(j)1}$ to $\sigma_{(j)K}$ of the K items for each unit space $x_{(j)}$ by equations (4) and (5). The unit space information creation device 200 creates the unit spaces $x_{(1)}$ to $x_{(N+1)}$ represented by equation (7), and calculates an inverse matrix $R_{(j)}^{-1}$ of a correlation matrix $R_{(j)}$ related to the K items represented by equation (8) for each unit space $X_{(j)}$. The unit space information creation device 200 associates the normal mode, the average values $\mu_{(1)1}$ to $\mu_{(1)K}$, the standard deviations $\sigma_{(1)1}$ to $\sigma_{(1)K}$, and the inverse matrix $R_{(1)}^{-1}$, and associates the i-th abnormal mode, the average values $\mu_{(i+1)1}$ to $\mu_{(i+1)K}$, the standard deviations $\sigma_{(i+1)1}$ to $\sigma_{(i+1)K}$, and the inverse matrix $R_{(i+1)}^{-1}$ for an integer i greater than or equal to 2 and less than or equal to N+1 to create the unit space information shown in FIG. 3. The created unit space information is stored in a storage circuit of the abnormality determination device 100. Instead of the unit space information creation device 200, the abnormality determination device 100 may perform the unit space information creation step S10.

Next, in a measurement data acquisition step S20, the abnormality determination device 100 acquires the measurement data of the object 1 from the measuring instrument 2.

Next, in a first distance calculation step S30, the abnormality determination device 100 calculates the Mahalanobis distance $Mn_{(1)}$ in the unit space $x_{(1)}$ corresponding to the normal mode of the object 1 based on the measurement data of the object 1 acquired in step S20. Specifically, the abnormality determination device 100 calculates the data $y_{(1)}$ represented by equation (10) based on the measurement data, calculates the data $Y_{(1)}$ represented by equation (12) by using the average values $\mu_{(1)1}$ to $\mu_{(1)K}$ and the standard deviations $\sigma_{(1)1}$ to $\sigma_{(1)K}$ of the K items of the unit space $x_{(1)}$ included in the unit space information, and calculates the Mahalanobis distance $Mn_{(1)}$ of the data $y_{(1)}$ in the unit space $x_{(1)}$ by equation (13) by using the data $Y_{(1)}$ and the inverse matrix $R_{(1)}^{-1}$ included in the unit space information.

Next, in a second distance calculation step S40, the abnormality determination device 100 calculates, based on the measurement data of the object 1 acquired in the step S20, the Mahalanobis distance $Mn_{(i+1)}$ in the unit space $x_{(i+1)}$ corresponding to the i-th abnormal mode of the object 1 for the integer i greater than or equal to 1 and less than or equal to N. Specifically, the abnormality determination device 100 calculates data $y_{(i+1)}$ represented by equation (10) based on the measurement data, calculates the data $Y_{(i+1)}$ represented by equation (12) by using the average values $\mu_{(i+1)1}$ to $\mu_{(i+1)K}$ and the standard deviations $\sigma_{(i+1)1}$ to $\sigma_{(i+1)K}$ of the K items of the unit space $x_{(i+1)}$ included in the unit space information, and calculates the Mahalanobis distance $Mn_{(i+1)}$ of the data $y_{(i+1)}$ in the unit space $x_{(i+1)}$ by equation (13) by using the data $Y_{(i+1)}$ and the inverse matrix $R_{(i+1)}^{-1}$ included in the unit space information.

In step S50, the abnormality determination device 100 determines whether the Mahalanobis distance $Mn_{(1)}$ exceeds a threshold value. When the Mahalanobis distance $Mn_{(1)}$ does not exceed the threshold value, the abnormality determination device 100 determines in a normality determination step S80 that the object 1 is in the normal mode. The abnormality determination device 100 may display information indicating that the object 1 is in the normal mode to the display unit.

Figure 5:
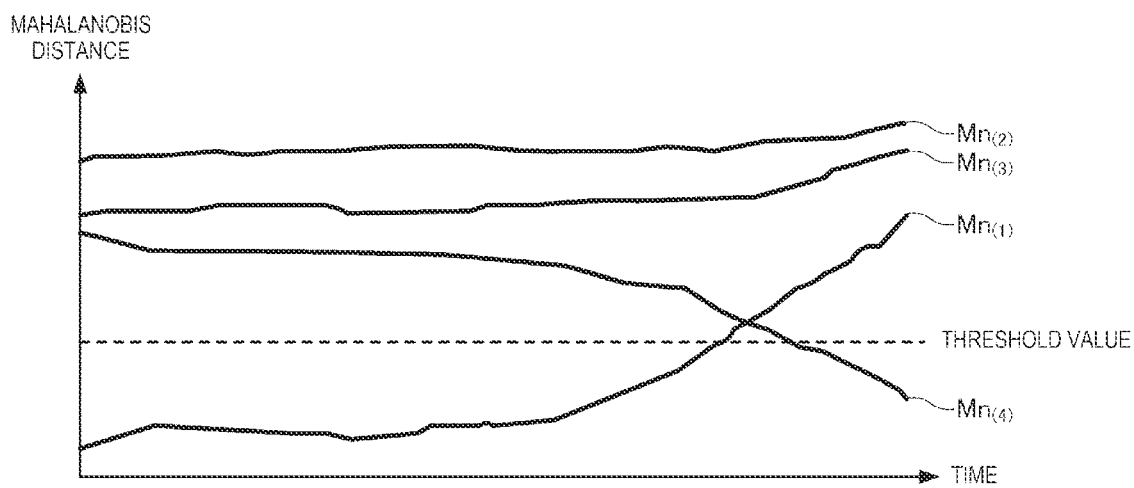
FIG. 5 shows an example of a change in a Mahalanobis distance.

Further, when the Mahalanobis distance $Mn_{(1)}$ exceeds the threshold value, in an abnormality determination step S60, the abnormality determination device 100 determines one of the first to N-th abnormal modes where the object 1 is based on the Mahalanobis distances $Mn_{(2)}$ to $Mn_{(N+1)}$ calculated in step S40. In the present embodiment, in the abnormality determination step S60, when a Mahalanobis distance $Mn_{(j+1)}$ is minimum among the Mahalanobis distances $Mn_{(2)}$ to $Mn_{(N+1)}$, the abnormality determination device 100 determines that the object 1 is in the j-th abnormal mode. In the example shown in FIG. 5, when the Mahalanobis distance $Mn_{(1)}$ exceeds the threshold value, since a Mahalanobis distance $Mn_{(4)}$ is minimum among Mahalanobis distances $Mn_{(2)}$ to $Mn_{(4)}$, the abnormality determination device 100 determines that the object 1 is in a third abnormal mode.

Next, in an abnormal mode display step S70, the abnormality determination device 100 displays the abnormal mode determined in step S60 on the display unit.

Then, in step S90, the abnormality determination device 100 repeatedly performs steps S10 to S80 until abnormality determination processing ends.

In FIG. 4, step S40 is performed before step S50. Alternatively, step S40 may be performed between step S50 and step S60.

1-4. Abnormality Determination Device

Figure 6:
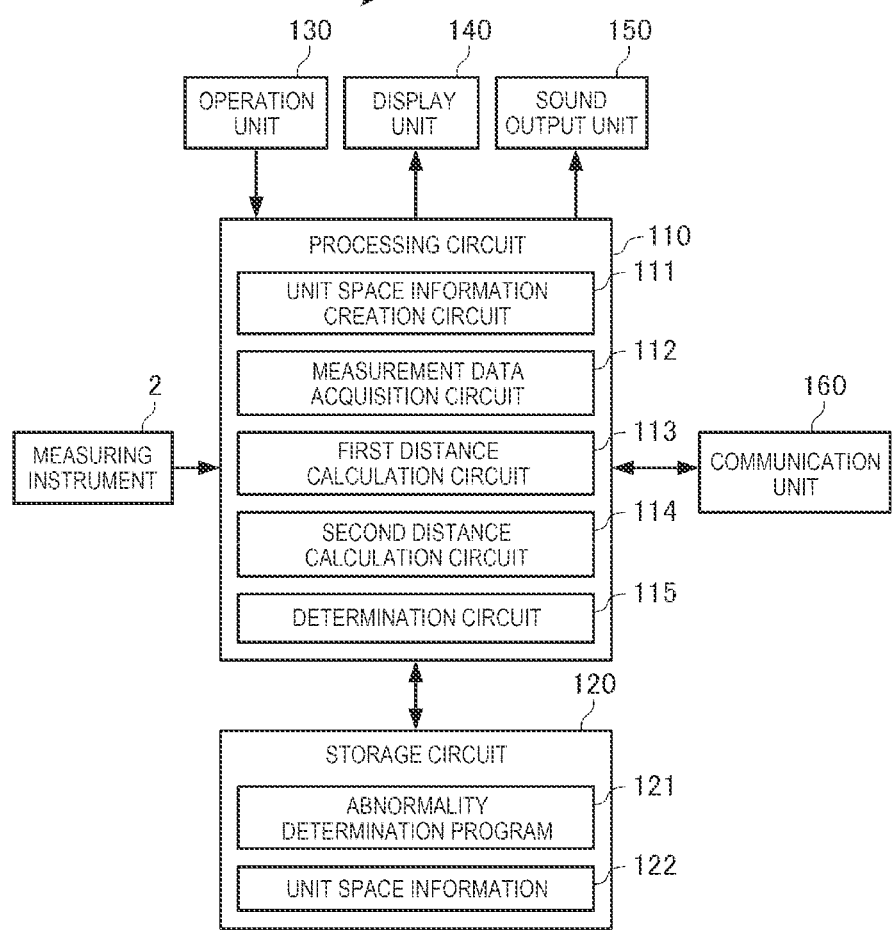
FIG. 6 shows a configuration example of an abnormality determination device according to the first embodiment.

FIG. 6 shows a configuration example of the abnormality determination device 100. As shown in FIG. 6, the abnormality determination device 100 includes a processing circuit 110, a storage circuit 120, an operation unit 130, a display unit 140, a sound output unit 150, and a communication unit 160. The abnormality determination device 100 may omit or change some of the components in FIG. 6, or add other components.

The storage circuit 120 includes a nonvolatile memory that stores various programs and predetermined data. In the present embodiment, the storage circuit 120 stores an abnormality determination program 121 and unit space information 122 in advance. The unit space information 122 is the information shown in FIG. 3. The storage circuit 120 is used as a work area of the processing circuit 110, and includes a volatile memory that stores data input from the operation unit 130 and data temporarily generated by the processing circuit 110.

The processing circuit 110 performs processing for determining whether the object 1 is in the normal mode or the first to N-th abnormal modes based on the measurement data of the object 1 output from the measuring instrument 2. Specifically, the processing circuit 110 runs the abnormality determination program 121 stored in the storage circuit 120, and performs various calculation processing on the measurement data. In addition, the processing circuit 110 performs various processing according to operation signals from the operation unit 130, processing for transmitting a display signal for displaying various information on the display unit 140, processing for transmitting a sound signal for generating various sounds to the sound output unit 150, processing for controlling the communication unit 160 to perform data communication with an external device (not shown), and the like. The processing circuit 110 is implemented by, for example, a CPU or a DSP. The CPU is an abbreviation for central processing unit, and the DSP is an abbreviation for digital signal processor.

The processing circuit 110 functions as a measurement data acquisition circuit 112, a first distance calculation circuit 113, a second distance calculation circuit 114, and a determination circuit 115 by running the abnormality determination program 121. That is, the abnormality determination device 100 includes the measurement data acquisition circuit 112, the first distance calculation circuit 113, the second distance calculation circuit 114, and the determination circuit 115. The processing circuit 110 may function as a unit space information creation circuit 111 by running the abnormality determination program 121. That is, the abnormality determination device 100 may include the unit space information creation circuit 111.

The unit space information creation circuit 111 creates the unit space $x_{(1)}$ corresponding to the normal mode of the object 1 and the unit spaces $x_{(2)}$ to $x_{(N+1)}$ corresponding to the first to N-th abnormal modes of the object 1 and creates the unit space information 122 on the unit spaces $x_{(1)}$ to $x_{(N+1)}$. Specifically, the unit space information creation circuit 111 creates the unit spaces $x_{(1)}$ to $x_{(N+1)}$ represented by equation (1), and calculates the average values $\mu_{(j)1}$ to $\mu_{(j)K}$ and the standard deviations $\sigma_{(j)1}$ to $\sigma_{(j)K}$ of the K items for each unit space $x_{(j)}$ by equations (4) and (5). The unit space information creation circuit 111 creates the unit spaces $x_{(1)}$ to $x_{(N+1)}$ represented by equation (7), and calculates the inverse matrix $R_{(j)}^{-1}$ of the correlation matrix $R_{(j)}$ related to the K items represented by equation (8) for each unit space $X_{(j)}$. The unit space information creation circuit 111 associates the normal mode, the average values $\mu_{(1)1}$ to $\mu_{(1)K}$, the standard deviations $\sigma_{(1)1}$ to $\sigma_{(1)K}$, and the inverse matrix $R_{(1)}^{-1}$, associates the i-th abnormal mode, the average values $\mu_{(i+1)1}$ to $\mu_{(i+1)K}$, the standard deviations $\sigma_{(i+1)1}$ to $\sigma_{(i+1)K}$, and the inverse matrix $R_{(i+1)}^{-1}$ for the integer i greater than or equal to 2 and less than or equal to N+1 to create the unit space information 122, and stores the created unit space information 122 in the storage circuit 120. That is, the unit space information creation circuit 111 performs the unit space information creation step S10 as shown in FIG. 4. As described above, when the unit space information creation device 200 creates the unit space information 122, the unit space information creation circuit 111 may be omitted.

The measurement data acquisition circuit 112 acquires the measurement data of the object 1 output from the measuring instrument 2. That is, the measurement data acquisition circuit 112 performs the measurement data acquisition step S20 as shown in FIG. 4. The measurement data acquired by the measurement data acquisition circuit 112 is stored in the storage circuit 120.

The first distance calculation circuit 113 calculates the Mahalanobis distance $Mn_{(1)}$ in the unit space $x_{(1)}$ corresponding to the normal mode of the object 1 based on the measurement data of the object 1 acquired by the measurement data acquisition circuit 112. Specifically, the first distance calculation circuit 113 calculates the data $y_{(1)}$ represented by equation (10) based on the measurement data, calculates the data $Y_{(1)}$ represented by equation (12) by using the average values $\mu_{(1)1}$ to $\mu_{(1)K}$ and the standard deviations $\sigma_{(1)1}$ to $\sigma_{(1)K}$ of the K items of the unit space $x_{(1)}$ included in the unit space information 122, and calculates the Mahalanobis distance $Mn_{(1)}$ of the data $y_{(1)}$ in the unit space $x_{(1)}$ by equation (13) by using the data $Y_{(1)}$ and the inverse matrix $R_{(1)}^{-1}$ included in the unit space information 122. That is, the first distance calculation circuit 113 performs the first distance calculation step S30 in FIG. 4. The Mahalanobis distance $Mn_{(1)}$ calculated by the first distance calculation circuit 113 is stored in the storage circuit 120.

The second distance calculation circuit 114 calculates, based on the measurement data of the object 1 acquired by the measurement data acquisition circuit 112, the Mahalanobis distance $Mn_{(i+1)}$ in the unit space $x_{(i+1)}$ corresponding to the i-th abnormal mode of the object 1 for the integer i greater than or equal to 1 and less than or equal to N. Specifically, the second distance calculation circuit 114 calculates the data $y_{(i+1)}$ represented by equation (10) based on the measurement data, calculates the data $Y_{(i+1)}$ represented by equation (12) by using the average values $\mu_{(i+1)1}$ to $\mu_{(i+1)K}$ and the standard deviations $\sigma_{(i+1)1}$ to $\sigma_{(i+1)K}$ of the K items of the unit space $x_{(i+1)}$ included in the unit space information 122, and calculates the Mahalanobis distance $Mn_{(i+1)}$ of the data $y_{(i+1)}$ in the unit space $x_{(i+1)}$ by equation (13) by using the data $Y_{(i+1)}$ and the inverse matrix $R_{(i+1)}^{-1}$ included in the unit space information 122. That is, the second distance calculation circuit 114 performs the second distance calculation step S40 as shown in FIG. 4. The Mahalanobis distances $Mn_{(2)}$ to $Mn_{(N+1)}$ calculated by the second distance calculation circuit 114 are stored in the storage circuit 120.

The determination circuit 115 determines whether the Mahalanobis distance $Mn_{(1)}$ calculated by the first distance calculation circuit 113 exceeds the threshold value. When the Mahalanobis distance $Mn_{(1)}$ does not exceed the threshold value, the determination circuit 115 determines that the object 1 is in the normal mode. When the Mahalanobis distance $Mn_{(1)}$ exceeds the threshold value, the determination circuit 115 determines one of the first to N-th abnormal modes where the object 1 is based on the Mahalanobis distances $Mn_{(2)}$ to $Mn_{(N+1)}$ calculated by the second distance calculation circuit 114. In the present embodiment, when the Mahalanobis distance $Mn_{(j+1)}$ is minimum among the Mahalanobis distances $Mn_{(2)}$ to $Mn_{(N+1)}$, the determination circuit 115 determines that the object 1 is in the j-th abnormal mode. That is, the determination circuit 115 performs step S50, the normality determination step S80, and the abnormality determination step S60 as shown in FIG. 4. A determination result of the determination circuit 115 is stored in the storage circuit 120.

The operation unit 130 is an input device including operation keys, button switches, and the like, and outputs an operation signal corresponding to an operation by a user to the processing circuit 110.

The display unit 140 is a display device including a LCD or the like, and displays various information based on a display signal output from the processing circuit 110. LCD is an abbreviation for liquid crystal display. The display unit 140 may be provided with a touch panel that functions as the operation unit 130. For example, the display unit 140 may display information on a determination result indicating whether the object 1 is in the normal mode or the first to N-th abnormal modes based on the display signal output from the processing circuit 110.

The sound output unit 150 includes a speaker or the like, and generates various sounds based on a sound signal output from the processing circuit 110. For example, the sound output unit 150 may generate, based on the sound signal output from the processing circuit 110, a sound indicating the start or end of the abnormality determination processing, a sound indicating whether the object 1 is in the normal mode or the first to N-th abnormal modes, or the like.

The communication unit 160 performs various controls for establishing data communication between the processing circuit 110 and an external device. For example, the communication unit 160 may transmit information on the determination result by the determination circuit 115 to the external device, and the external device may display the received information on the determination result on a display unit (not shown).

At least a part of the unit space information creation circuit 111, the measurement data acquisition circuit 112, the first distance calculation circuit 113, the second distance calculation circuit 114, and the determination circuit 115 may be implemented by dedicated hardware. The abnormality determination device 100 may be a single device or may include a plurality of devices. For example, the processing circuit 110 and the storage circuit 120 may be implemented by a device such as a cloud server, and the device may determine whether the object 1 is in the normal mode or the first to N-th abnormal modes and transmit the information on the determination result to a terminal including the operation unit 130, the display unit 140, the sound output unit 150, and the communication unit 160 via a communication line.

1-5. Function and Effect

In the abnormality determination method of the first embodiment described above, based on the measurement data of the object 1, the abnormality determination device 100 calculates the Mahalanobis distance $Mn_{(1)}$ in the unit space $x_{(1)}$ corresponding to the normal mode of the object 1 and calculates the Mahalanobis distances $Mn_{(2)}$ to $Mn_{(N+1)}$ in the unit spaces $x_{(2)}$ to $x_{(N+1)}$ corresponding to the first to N-th abnormal modes of the object 1. Therefore, according to the abnormality determination method of the first embodiment, when the Mahalanobis distance $Mn_{(1)}$ exceeds the threshold value, that is, when the object 1 deviates from the normal mode, the abnormality determination device 100 can specify an abnormal mode of the object 1 based on the Mahalanobis distances $Mn_{(2)}$ to $Mn_{(N+1)}$.

According to the abnormality determination method of the first embodiment, since the abnormality determination device 100 can specify the abnormal mode of the object 1, the user can easily take appropriate measures for the abnormal object 1.

2. Second Embodiment

Hereinafter, in a second embodiment, the same elements as those in the first embodiment will be denoted by the same reference numerals, repetitive descriptions as in the first embodiment will be omitted or simplified, and contents different from those in the first embodiment will be mainly described.

Figure 7:
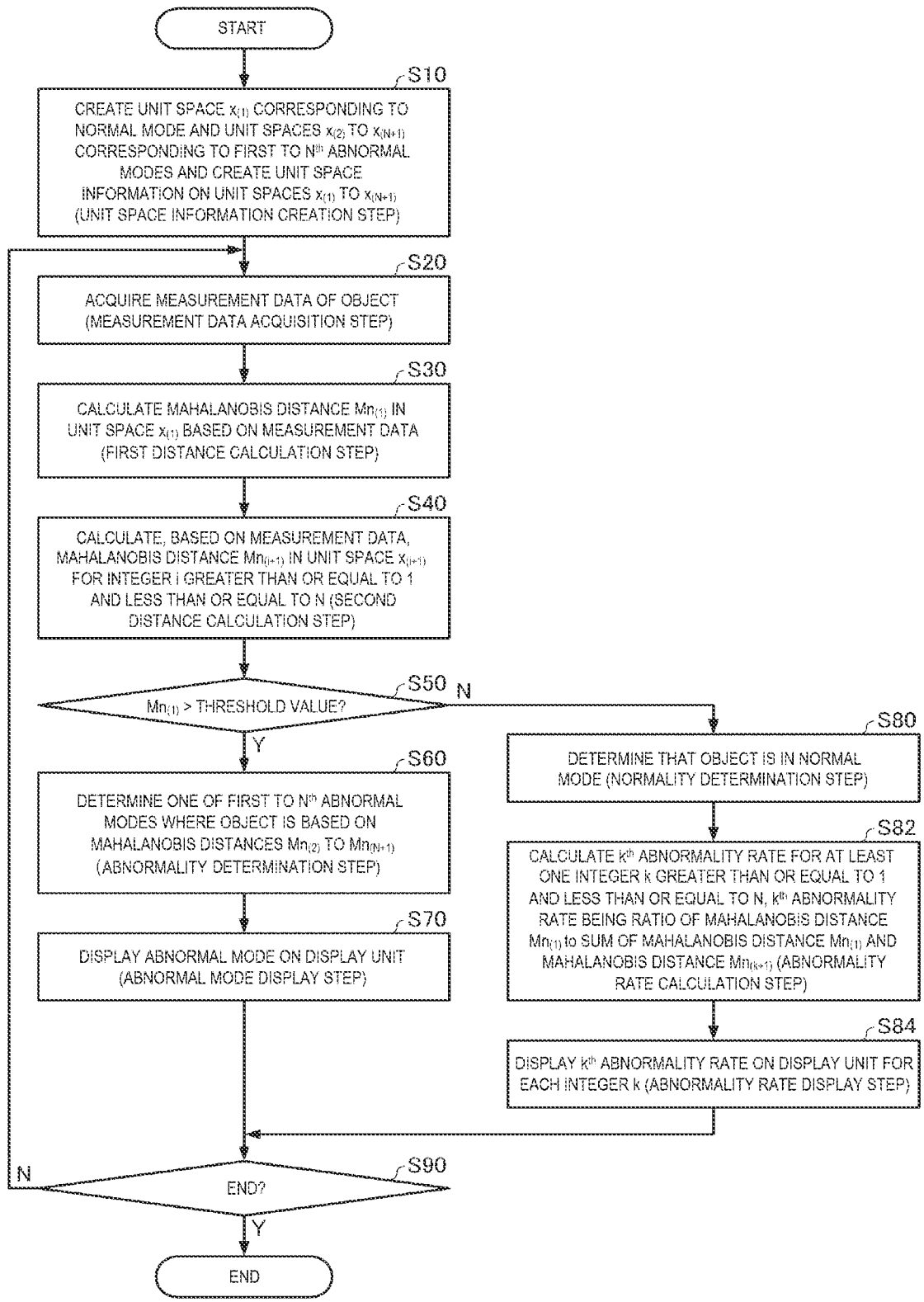
FIG. 7 is a flowchart showing a procedure of an abnormality determination method according to a second embodiment.

FIG. 7 is a flowchart showing a procedure of an abnormality determination method according to the second embodiment. In FIG. 7, the same steps as in FIG. 4 are denoted by the same reference numerals. As shown in FIG. 7, in the second embodiment, similarly to the first embodiment, first, in the unit space information creation step S10, the unit space information creation device 200 or the abnormality determination device 100 creates unit space information.

Next, similarly to the first embodiment, the abnormality determination device 100 performs the measurement data acquisition step S20, the first distance calculation step S30, the second distance calculation step S40, and step S50, and performs the normality determination step S80 when the Mahalanobis distance $Mn_{(1)}$ does not exceed the threshold value.

Next, in an abnormality rate calculation step S82, the abnormality determination device 100 calculates a k-th abnormality rate, which is a ratio of the Mahalanobis distance $Mn_{(1)}$ to a sum of the Mahalanobis distance $Mn_{(1)}$ and a Mahalanobis distance $Mn_{(k+1)}$, for at least one integer k greater than or equal to 1 and less than or equal to N. The k-th abnormality rate is an index indicating how close the state of the object 1 is from the normal mode to the k-th abnormal mode, and indicates that the state of the object 1 is closer to the k-th abnormal mode as the value is greater. The k-th abnormality rate may be calculated as a value in a range of 0% or more and 1% or less, or may be calculated as a value in a range of 0% or more and 100% or less. For example, when the Mahalanobis distance $Mn_{(1)}$ is 0 and the Mahalanobis distance $Mn_{(k+1)}$ is 5, the k-th abnormality rate is 0%. For example, when the Mahalanobis distance $Mn_{(1)}$ is 3 and the Mahalanobis distance $Mn_{(k+1)}$ is 2, the k-th abnormality rate is 60%. The abnormality determination device 100 may calculate all of the first to N-th abnormality rates, or may calculate only a j-th abnormality rate when the Mahalanobis distance $Mn_{(j+1)}$ is minimum among the Mahalanobis distances $Mn_{(2)}$ to $Mn_{(N+1)}$.

Next, in an abnormality rate display step S84, the k-th abnormality rate calculated in step S82 is displayed on the display unit for each integer k.

Further, when the Mahalanobis distance $Mn_{(1)}$ exceeds the threshold value, the abnormality determination device 100 performs the abnormality determination step S60 and the abnormal mode display step S70 as in the first embodiment.

Then, in step S90, the abnormality determination device 100 repeatedly performs steps S10 to S84 until the abnormality determination processing ends.

Figure 8:
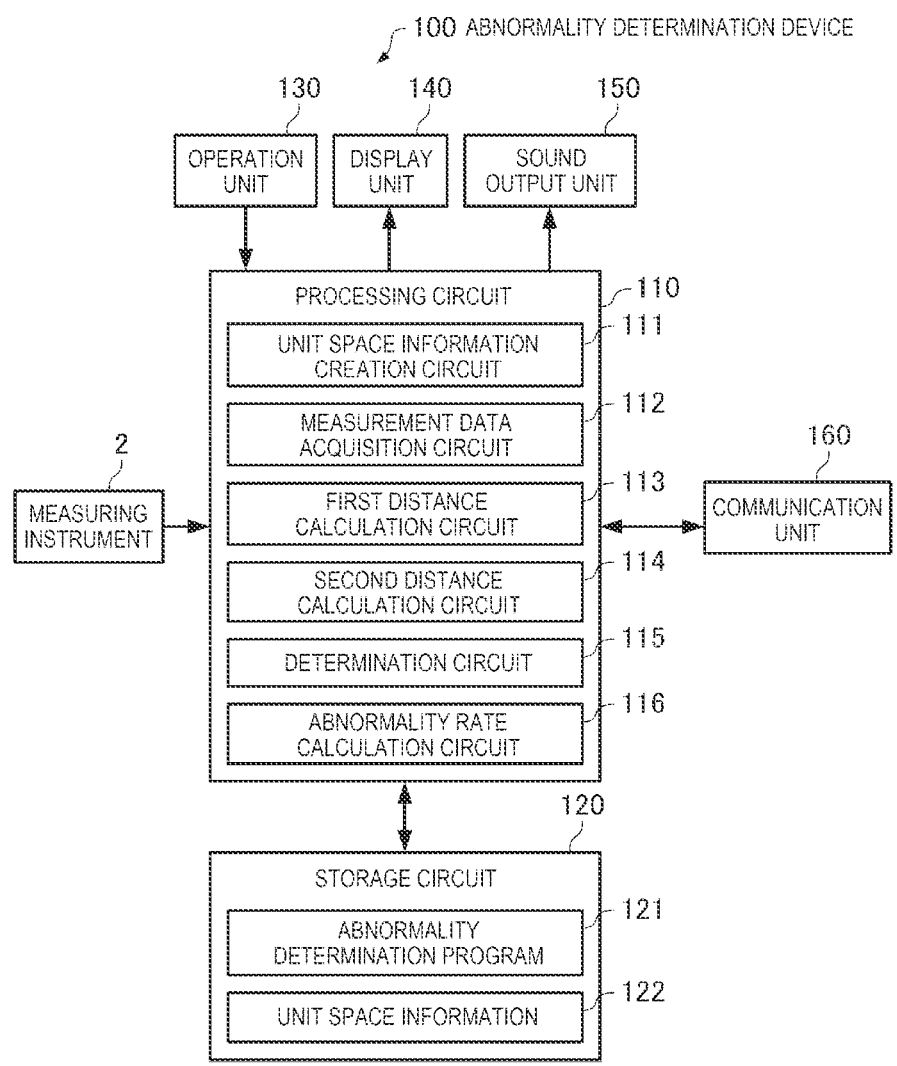
FIG. 8 shows a configuration example of an abnormality determination device according to the second embodiment.

FIG. 8 shows a configuration example of the abnormality determination device 100 according to the second embodiment. As shown in FIG. 8, the abnormality determination device 100 according to the second embodiment includes the processing circuit 110, the storage circuit 120, the operation unit 130, the display unit 140, the sound output unit 150, and the communication unit 160, similarly to the first embodiment. The abnormality determination device 100 may omit or change some of the components in FIG. 8, or add other components. The functions of the storage circuit 120, the operation unit 130, the display unit 140, the sound output unit 150, and the communication unit 160 are the same as those in the first embodiment, and thus the description thereof will be omitted.

The processing circuit 110 functions as the measurement data acquisition circuit 112, the first distance calculation circuit 113, the second distance calculation circuit 114, the determination circuit 115, and an abnormality rate calculation circuit 116 by running the abnormality determination program 121 stored in the storage circuit 120. That is, the abnormality determination device 100 includes the measurement data acquisition circuit 112, the first distance calculation circuit 113, the second distance calculation circuit 114, the determination circuit 115, and the abnormality rate calculation circuit 116. The processing circuit 110 may function as the unit space information creation circuit 111 by running the abnormality determination program 121. That is, the abnormality determination device 100 may include the unit space information creation circuit 111. The functions of the unit space information creation circuit 111, the measurement data acquisition circuit 112, the first distance calculation circuit 113, the second distance calculation circuit 114, and the determination circuit 115 are the same as those in the first embodiment, and thus the description thereof will be omitted.

The abnormality rate calculation circuit 116 calculates the k-th abnormality rate, which is a ratio of the Mahalanobis distance $Mn_{(1)}$ calculated by the first distance calculation circuit 113 to the sum of the Mahalanobis distance $Mn_{(1)}$ and the Mahalanobis distance $Mn_{(k+1)}$ calculated by the second distance calculation circuit 114, for at least one integer k greater than or equal to 1 and less than or equal to N. The abnormality rate calculation circuit 116 may calculate all of the first to N-th abnormality rates, or may calculate only the j-th abnormality rate when the Mahalanobis distance $Mn_{(j+1)}$ is minimum among the Mahalanobis distances $Mn_{(2)}$ to $Mn_{(N+1)}$. That is, the abnormality rate calculation circuit 116 performs the abnormality rate calculation step S82 as shown in FIG. 7. The abnormality rate calculated by the abnormality rate calculation circuit 116 is stored in the storage circuit 120.

The display unit 140 may display the information on the determination result indicating whether the object 1 is in the normal mode or the first to N-th abnormal modes or information on the abnormality rate based on the display signal output from the processing circuit 110.

For example, the sound output unit 150 may generate, based on the sound signal output from the processing circuit 110, the sound indicating the start or end of the abnormality determination processing, the sound indicating whether the object 1 is in the normal mode or the first to N-th abnormal modes, or a sound indicating the abnormality rate.

The communication unit 160 may transmit the information on the determination result by the determination circuit 115 or the information on the abnormality rate to the external device, and the external device may display the received information on the determination result on a display unit (not shown).

At least a part of the unit space information creation circuit 111, the measurement data acquisition circuit 112, the first distance calculation circuit 113, the second distance calculation circuit 114, the determination circuit 115, and the abnormality rate calculation circuit 116 may be implemented by dedicated hardware. The abnormality determination device 100 may be a single device or may include a plurality of devices. For example, the processing circuit 110 and the storage circuit 120 may be implemented by a device such as a cloud server, and the device may determine whether the object 1 is in the normal mode or the first to N-th abnormal modes, calculate the abnormality rate, and transmit the information on the determination result or abnormality rate to a terminal including the operation unit 130, the display unit 140, the sound output unit 150, and the communication unit 160 via the communication line.

According to the abnormality determination method of the second embodiment described above, the same effects as those of the abnormality determination method of the first embodiment can be achieved. Further, according to the abnormality determination method of the second embodiment, the abnormality determination device 100 calculates the k-th abnormality rate, which is the ratio of the Mahalanobis distance $Mn_{(1)}$ to the sum of the Mahalanobis distance $Mn_{(1)}$ and the Mahalanobis distance $Mn_{(k+1)}$, for at least one integer k greater than or equal to 1 and less than or equal to N, and thus it is possible to relatively indicate how close the object 1 is to the k-th abnormal mode.

3. Third Embodiment

Hereinafter, in a third embodiment, the same elements as those in the first embodiment or the second embodiment will be denoted by the same reference numerals, repetitive descriptions as in the first embodiment or the second embodiment will be omitted or simplified, and contents different from those in the first embodiment or the second embodiment will be mainly described.

Figure 9:
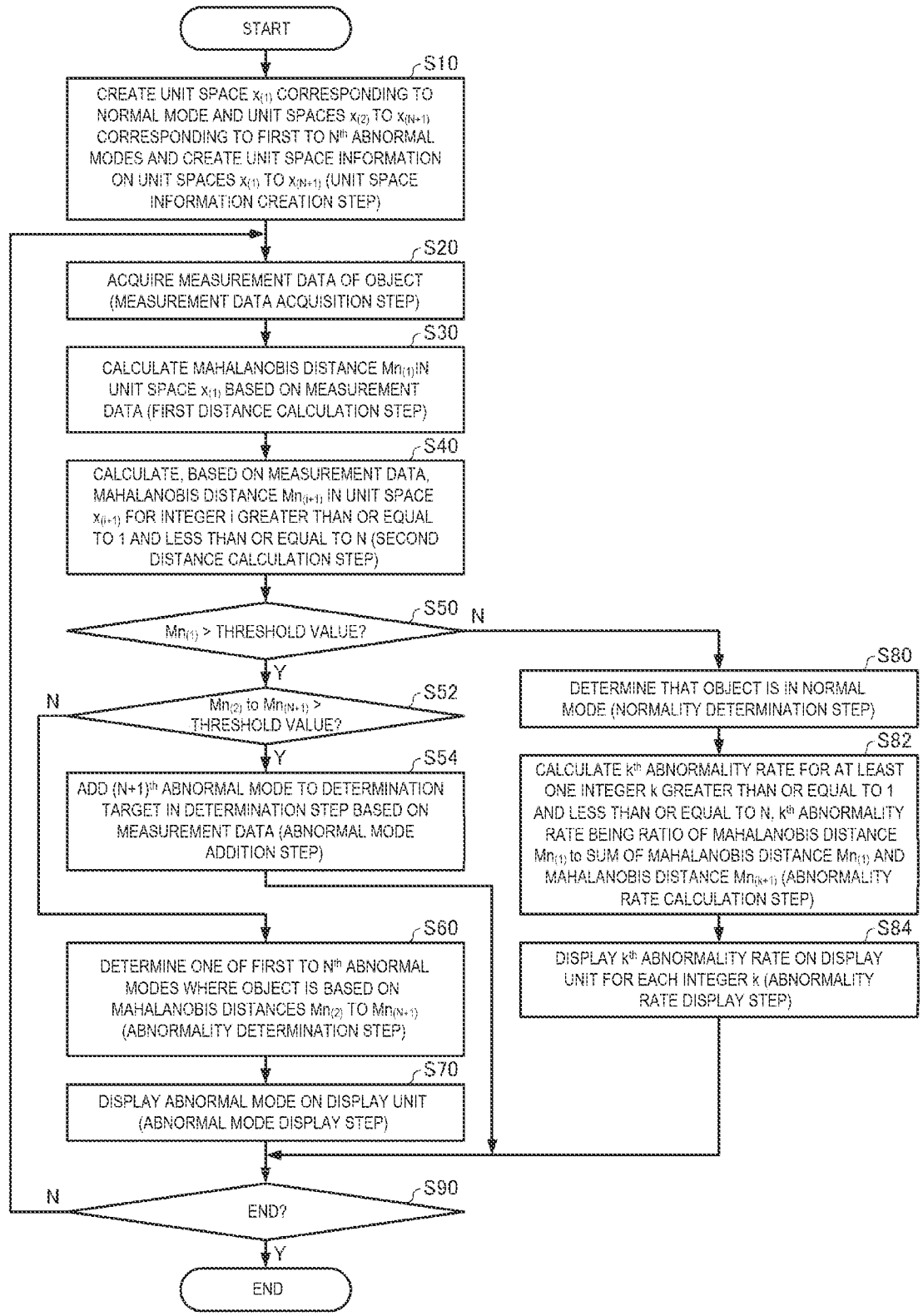
FIG. 9 is a flowchart showing a procedure of an abnormality determination method according to a third embodiment.

FIG. 9 is a flowchart showing a procedure of an abnormality determination method according to the third embodiment. In FIG. 9, the same steps as in FIG. 4 or FIG. 7 are denoted by the same reference numerals. As shown in FIG. 9, in the third embodiment, similarly to the first embodiment and the second embodiment, first, in the unit space information creation step S10, the unit space information creation device 200 or the abnormality determination device 100 creates unit space information.

Next, similarly to the first embodiment and the second embodiment, the abnormality determination device 100 performs the measurement data acquisition step S20, the first distance calculation step S30, the second distance calculation step S40, and step S50, and performs the normality determination step S80 when the Mahalanobis distance $Mn_{(1)}$ does not exceed the threshold value.

Next, as in the second embodiment, the abnormality determination device 100 performs the abnormality rate calculation step S82 and the abnormality rate display step S84.

When the Mahalanobis distance $Mn_{(1)}$ exceeds the threshold value, in step S52, the abnormality determination device 100 determines whether the Mahalanobis distances $Mn_{(2)}$ to $Mn_{(N+1)}$ exceed the threshold value. When at least one of the Mahalanobis distances $Mn_{(2)}$ to $Mn_{(N+1)}$ does not exceed the threshold value, the abnormality determination device 100 performs the abnormality determination step S60 and the abnormal mode display step S70 as in the first embodiment and the second embodiment.

Further, when all of the Mahalanobis distances $Mn_{(2)}$ to $Mn_{(N+1)}$ exceed the threshold value, that is, when all of the Mahalanobis distances $Mn_{(1)}$ to $Mn_{(N+1)}$ exceed the threshold value, in an abnormal mode addition step S54, the abnormality determination device 100 adds an (N+1)-th abnormal mode different from the first to N-th abnormal modes to a determination target in the abnormality determination step S60 based on the measurement data acquired in step S20. Specifically, when all of the Mahalanobis distances $Mn_{(1)}$ to $Mn_{(N+1)}$ exceed the threshold value, the abnormality determination device 100 creates a unit space $x_{(N+2)}$ represented by equation (1) based on the measurement data, and calculates average values $\mu_{(N+2)1}$ to $\mu_{(N+2)K}$ and standard deviations $\sigma_{(N+2)1}$ to $\sigma_{(N+2)K}$ of the K items for the unit space $x_{(N+2)}$ by equations (4) and (5). The abnormality determination device 100 creates a unit space $X_{(N+2)}$ represented by equation (7), and calculates an inverse matrix $R_{(N+2)}^{-1}$ of a correlation matrix $R_{(N+2)}$ related to the K items represented by equation (8) for the unit space $X_{(N+2)}$. The abnormality determination device 100 adds the (N+1)-th abnormal mode, the average values $\mu_{(N+2)1}$ to $\mu_{(N+2)K}$, the standard deviations $\sigma_{(N+2)1}$ to $\sigma_{(N+2)K}$, and the inverse matrix $R_{(N+2)}^{-1}$ in association with each other to the unit space information stored in the storage circuit, and increments the integer N by 1. The abnormality determination device 100 may perform processing for the abnormality determination step S60 based on an input operation of instructing addition of an abnormal mode by the user, or may automatically perform the abnormality determination step S60 without depending on the input operation.

Then, in step S90, the abnormality determination device 100 repeatedly performs steps S10 to S84 until the abnormality determination processing ends.

Figure 10:
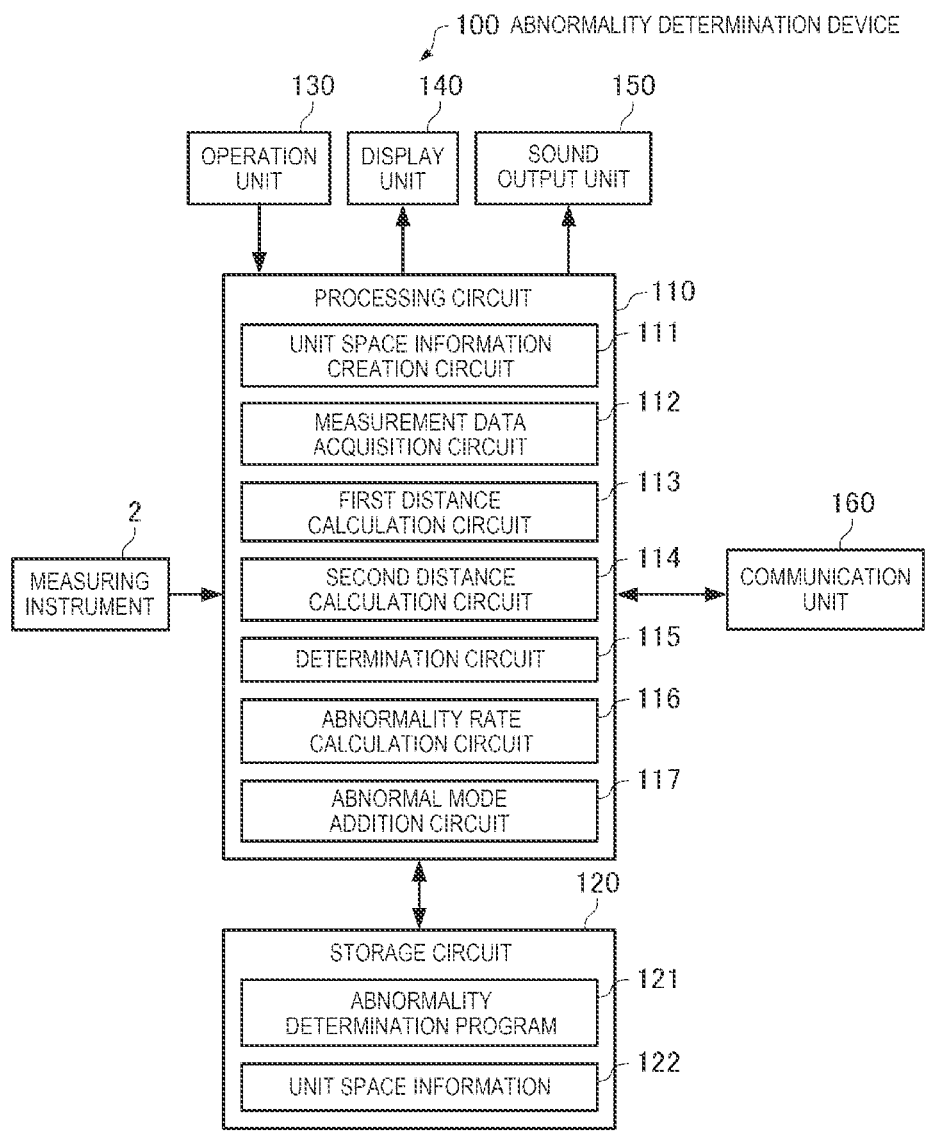
FIG. 10 shows a configuration example of an abnormality determination device according to the third embodiment.

FIG. 10 shows a configuration example of the abnormality determination device 100 according to the third embodiment. As shown in FIG. 10, the abnormality determination device 100 according to the third embodiment includes the processing circuit 110, the storage circuit 120, the operation unit 130, the display unit 140, the sound output unit 150, and the communication unit 160, similarly to the first embodiment and the second embodiment. The abnormality determination device 100 may omit or change some of the components in FIG. 10, or add other components. The functions of the storage circuit 120, the operation unit 130, the display unit 140, the sound output unit 150, and the communication unit 160 are the same as those in the first embodiment and the second embodiment, and thus the description thereof will be omitted.

The processing circuit 110 functions as the measurement data acquisition circuit 112, the first distance calculation circuit 113, the second distance calculation circuit 114, the determination circuit 115, the abnormality rate calculation circuit 116, and an abnormal mode addition circuit 117 by running the abnormality determination program 121 stored in the storage circuit 120. That is, the abnormality determination device 100 includes the measurement data acquisition circuit 112, the first distance calculation circuit 113, the second distance calculation circuit 114, the determination circuit 115, the abnormality rate calculation circuit 116, and the abnormal mode addition circuit 117. The processing circuit 110 may function as the unit space information creation circuit 111 by running the abnormality determination program 121. That is, the abnormality determination device 100 may include the unit space information creation circuit 111. The functions of the unit space information creation circuit 111, the measurement data acquisition circuit 112, the first distance calculation circuit 113, the second distance calculation circuit 114, and the determination circuit 115 are the same as those in the first embodiment and the second embodiment, and thus the description thereof will be omitted. Since a function of the abnormality rate calculation circuit 116 is similar to that of the second embodiment, description thereof will be omitted.

When all of the Mahalanobis distances $Mn_{(1)}$ to $Mn_{(N+1)}$ exceed the threshold value, the abnormal mode addition circuit 117 adds the (N+1)-th abnormal mode different from the first to N-th abnormal modes to the determination target by the determination circuit 115 based on the measurement data. Specifically, when all of the Mahalanobis distances $Mn_{(1)}$ to $Mn_{(N+1)}$ exceed the threshold value, the abnormal mode addition circuit 117 creates a unit space $x_{(N+2)}$ represented by equation (1) based on the measurement data, and calculates the average values $\mu_{(N+2)1}$ to $\mu_{(N+2)K}$ and the standard deviations $\sigma_{(N+2)1}$ to $\sigma_{(N+2)K}$ of the K items for the unit space $x_{(N+2)}$ by equations (4) and (5). The abnormal mode addition circuit 117 creates the unit space $X_{(N+2)}$ represented by equation (7), and calculates the inverse matrix $R_{(N+2)}^{-1}$ of the correlation matrix $R_{(N+2)}$ related to the K items represented by equation (8) for the unit space $X_{(N+2)}$. The abnormal mode addition circuit 117 adds the (N+1)-th abnormal mode, the average values $\mu_{(N+2)1}$ to $\mu_{(N+2)K}$, the standard deviations $\sigma_{(N+2)1}$ to $\sigma_{(N+2)K}$, and the inverse matrix $R_{(N+2)}^{-1}$ in association with each other to the unit space information 122 stored in the storage circuit 120, and increments the integer N by 1. The abnormal mode addition circuit 117 may perform processing for adding the (N+1)-th abnormal mode to the determination target based on the input operation of instructing the addition of the abnormal mode performed by the user on the operation unit 130, or may perform processing for automatically adding the (N+1)-th abnormal mode to the determination target without depending on the input operation.

At least a part of the unit space information creation circuit 111, the measurement data acquisition circuit 112, the first distance calculation circuit 113, the second distance calculation circuit 114, the determination circuit 115, the abnormality rate calculation circuit 116, and the abnormal mode addition circuit 117 may be implemented by dedicated hardware. The abnormality determination device 100 may be a single device or may include a plurality of devices. For example, the processing circuit 110 and the storage circuit 120 may be implemented by a device such as a cloud server, and the device may determine whether the object 1 is in the normal mode or the first to N-th abnormal modes, calculate the abnormality rate, add the (N+1)-th abnormal mode to the determination target depending on conditions, and transmit the information on the determination result or abnormality rate to a terminal including the operation unit 130, the display unit 140, the sound output unit 150, and the communication unit 160 via the communication line.

According to the third embodiment described above, the same effects as those of the abnormality determination method of the first embodiment or the second embodiment can be achieved. According to the abnormality determination method of the third embodiment, the abnormality determination device 100 newly adds the (N+1)-th abnormal mode to the determination target when the object 1 is in a state different from any of the first to N-th abnormal modes, and thus it is also possible to deal with a case where an abnormal mode that is not assumed in an initial stage of determination occurs.

4. Modifications

The present disclosure is not limited to the above embodiments, and various modifications can be made within the scope of the gist of the present disclosure.

For example, in each of the embodiments described above, the K items are common in the unit spaces $x_{(1)}$ to $X_{(N+1)}$. Alternatively, the K items may be different in the unit space $x_{(i)}$ and the unit space $x_{(j)}$ for any two different integers i and j greater than or equal to 1 and less than or equal to N+1. In this case, the integer K may vary between the unit space $x_{(i)}$ and the unit space $x_{(j)}$. That is, K characteristic items in each of the normal mode and the first to N-th abnormal modes may be selected independently of other modes.

The embodiments and modifications described above are merely examples, and the present disclosure is not limited thereto. For example, each embodiment and each modification can be combined as appropriate.

The present disclosure includes a configuration substantially the same as the configuration described in the embodiments, for example, a configuration having the same function, method, and result, or a configuration having the same purpose and effect. The present disclosure includes a configuration achieved by replacing a non-essential portion of the configuration described in the embodiments. The present disclosure includes a configuration having the same function and effect as the configuration described in the embodiments, or a configuration capable of achieving the same purpose. The present disclosure includes a configuration in which a known technique is added to the configuration described in the embodiments.

The following contents are derived from the embodiments and modifications described above.

In one aspect, an abnormality determination method according to the present disclosure includes: a first distance calculation step of calculating, based on measurement data of an object, a first Mahalanobis distance in a first unit space corresponding to a normal mode of the object; a second distance calculation step of calculating, based on the measurement data, an (i+1)-th Mahalanobis distance in an (i+1)-th unit space corresponding to an i-th abnormal mode of the object for each integer i greater than or equal to 1 and less than or equal to N, N being an integer greater than or equal to 2; and an abnormality determination step of determining, based on the second to (N+1)-th Mahalanobis distances, one of the first to N-th abnormal modes where the object is when the first Mahalanobis distance exceeds a threshold value.

In the abnormality determination method, based on the measurement data of the object, the first Mahalanobis distance in the first unit space corresponding to the normal mode of the object is calculated, and the second to (N+1)-th Mahalanobis distances in the second to (N+1)-th unit spaces corresponding to the first to N-th abnormal modes of the object are calculated. Therefore, according to the abnormality determination method, when the first Mahalanobis distance exceeds the threshold value, that is, when the object deviates from a normal mode, the abnormal mode of the object can be specified based on the second to (N+1)-th Mahalanobis distances. According to the abnormality determination method, since the abnormal mode of the object can be specified, the user can easily take appropriate measures for an abnormal object.

In another aspect, in the abnormality determination method, in the abnormality determination step, when the first Mahalanobis distance exceeds the threshold value and the (j+1)-th Mahalanobis distance among the second to (N+1)-th Mahalanobis distances is minimum, it may be determined that the object is in the j-th abnormal mode.

In another aspect, the abnormality determination method may further include an abnormality rate calculation step of calculating a k-th abnormality rate for at least one integer k greater than or equal to 1 and less than or equal to N, the k-th abnormality rate being a ratio of the first Mahalanobis distance to a sum of the first Mahalanobis distance and the (k+1)-th Mahalanobis distance.

According to the abnormality determination method, it is possible to relatively indicate how close the object is to at least one abnormal mode.

In another aspect, the abnormality determination method may further include an abnormal mode addition step of creating an (N+2)-th unit space corresponding to an (N+1)-th abnormal mode different from the first to N-th abnormal modes based on the measurement data and adding the (N+1)-th abnormal mode to a determination target in the abnormality determination step when all of the first to (N+1)-th Mahalanobis distances exceed the threshold value.

According to the abnormality determination method, the (N+1)-th abnormal mode is newly added to the determination target when the object is in a state different from any of the first to N-th abnormal modes, and thus it is also possible to deal with a case where an abnormal mode that is not assumed in an initial stage of determination occurs.

In another aspect, an abnormality determination device includes: a first distance calculation circuit configured to calculate, based on measurement data of an object, a first Mahalanobis distance in a first unit space corresponding to a normal mode of the object; a second distance calculation circuit configured to calculate, based on the measurement data, an (i+1)-th Mahalanobis distance in an (i+1)-th unit space corresponding to an i-th abnormal mode of the object for each integer i greater than or equal to 1 and less than or equal to N, N being an integer greater than or equal to 2; and a determination circuit configured to determine, based on the second to (N+1)-th Mahalanobis distances, one of the first to N-th abnormal modes where the object is when the first Mahalanobis distance exceeds a threshold value.

The abnormality determination device calculates, based on the measurement data of the object, the first Mahalanobis distance in the first unit space corresponding to the normal mode of the object, and the second to (N+1)-th Mahalanobis distances in the second to (N+1)-th unit spaces corresponding to the first to N-th abnormal modes of the object. Therefore, according to the abnormality determination device, when the first Mahalanobis distance exceeds the threshold value, that is, when the object deviates from a normal mode, the abnormal mode of the object can be specified based on the second to (N+1)-th Mahalanobis distances. According to the abnormality determination device, since the abnormal mode of the object can be specified, the user can easily take appropriate measures for an abnormal object.

In another aspect, an abnormality determination system includes the abnormality determination device, and a measuring instrument attached to the object and configured to output the measurement data.

What is claimed is:

1. An abnormality determination method for causing a processor to execute a process, the abnormality determination method comprising executing on the processor the steps of:
   creating a first unit space corresponding to a normal mode of an object while the object is in a normal state, the object being either a bridge, a building, or a mechanical device;
   creating an (i+1)-th unit space corresponding to an i-th abnormal mode of the object while the object is in an abnormal state for each integer i greater than or equal to 1 and less than or equal to N, N being an integer greater than or equal to 2;
   measuring a physical quantity of the object by a measuring instrument attached to the object, the physical quantity being either acceleration, angular velocity, velocity, displacement, pressure, current, or voltage so as to provide measurement data;
   calculating a first Mahalanobis distance in the first unit space based on the measurement data;
   calculating an (i+1)-th Mahalanobis distance in the (i+1)-th unit space for each integer i based on the measurement data;
   determining whether the object is in the normal mode based on the calculated first Mahalanobis distance wherein the processor determines that the object is in the normal state when the calculated first Mahalanobis distance is within a first threshold range; and
   determining whether the object is in which one of the first to N-th abnormal modes based on the calculated (i+1)-th Mahalanobis distances when the processor determines that the calculated first Mahalanobis distance is outside of the first threshold range,
   wherein the processor is configured to select a minimum Mahalanobis distance within the calculated (i+1)-th Mahalanobis distances as the one of the first to N-th abnormal modes for the object.

2. The method according to claim 1, wherein
   when the first Mahalanobis distance is outside of the first threshold range and a (j+1)-th Mahalanobis distance among the second to (N+1)-th Mahalanobis distances has the minimum Mahalanobis distance, the processor is further configured to determined that the object is in the j-th abnormal mode.

3. The method according to claim 1, further comprising:
   calculating a k-th abnormality rate for at least one integer k greater than or equal to 1 and less than or equal to N, the k-th abnormality rate being a ratio of the first Mahalanobis distance to a sum of the first Mahalanobis distance and the (k+1)-th Mahalanobis distance.

4. The method according to claim 1, further comprising:
   creating an (N+2)-th unit space corresponding to an (N+1)-th abnormal mode different from the first to N-th abnormal modes based on the measurement data and adding the (N+1)-th abnormal mode to the first to N-th abnormal modes for the object when all of the first to (N+1)-th Mahalanobis distances are outside of the first threshold range.

5. An abnormality determination device comprising:
   a memory configured to store a program; and
   a processor configured to execute the program so as to:
      create a first unit space corresponding to a normal mode of an object while the object is in a normal state, the object being either a bridge, a building, or a mechanical device;
      create an (i+1)-th unit space corresponding to an i-th abnormal mode of the object while the object is in an abnormal state for each integer i greater than or equal to 1 and less than or equal to N, N being an integer greater than or equal to 2;
      measure a physical quantity of the object by a measuring instrument attached to the object, the physical quantity being either acceleration, angular velocity, velocity, displacement, pressure, current, or voltage so as to provide measurement data;
      calculate a first Mahalanobis distance in the first unit space based on the measurement data;
      calculate an (i+1)-th Mahalanobis distance in the (i+1)-th unit space for each integer i based on the measurement data;
      determine whether the object is in the normal mode based on the calculated first Mahalanobis distance wherein the processor determines that the object is in the normal state when the calculated first Mahalanobis distance is within a first threshold range; and
      determine whether the object is in which one of the first to N-th abnormal modes based on the calculated (i+1)-th Mahalanobis distances when the processor determines that the calculated first Mahalanobis distance is outside of the first threshold range,
   wherein the processor is configured to select a minimum Mahalanobis distance within the calculated (i+1)-th Mahalanobis distances as the one of the first to N-th abnormal modes for the object.

6. An abnormality determination system comprising:
   the abnormality determination device according to claim 5; and
   the measuring instrument attached to the object and configured to output the measurement data.

* * * * *